United States Patent
Landes et al.

(10) Patent No.: US 9,952,115 B2
(45) Date of Patent: Apr. 24, 2018

(54) ANGLE OF REPOSE DETECTOR FOR HAULING MACHINES

(71) Applicant: Caterpillar Inc., Peoria, IL (US)

(72) Inventors: James Landes, East Peoria, IL (US); Timothy Schwartz, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/011,954

(22) Filed: Feb. 1, 2016

(65) Prior Publication Data

US 2017/0219453 A1 Aug. 3, 2017

(51) Int. Cl.
| | | |
|---|---|---|
| B66F 9/00 | (2006.01) | |
| G01M 1/12 | (2006.01) | |
| B60P 1/04 | (2006.01) | |
| B60P 1/28 | (2006.01) | |

(52) U.S. Cl.
CPC ............ *G01M 1/122* (2013.01); *B60P 1/045* (2013.01); *B60P 1/28* (2013.01)

(58) Field of Classification Search
CPC ................................. G01M 1/122; B60P 1/045
See application file for complete search history.

(56) References Cited

U.S. PATENT DOCUMENTS

| | | | |
|---|---|---|---|
| 7,810,887 B2 | 10/2010 | Hjerth et al. | |
| 8,412,485 B2 | 4/2013 | Brown | |
| 8,700,274 B1 | 4/2014 | Tejeda et al. | |
| 8,840,189 B2 | 9/2014 | Minoshima et al. | |
| 8,903,612 B2 | 12/2014 | Tejeda et al. | |
| 9,097,520 B2 | 8/2015 | Stratton et al. | |
| 9,114,705 B2 | 8/2015 | Goraya et al. | |
| 2007/0135985 A1* | 6/2007 | Berry | E02F 9/2029 701/50 |
| 2008/0319710 A1* | 12/2008 | Hsu | G01G 19/083 702/174 |
| 2010/0045092 A1* | 2/2010 | Hjerth | B60P 1/045 298/17 S |
| 2011/0196623 A1* | 8/2011 | Hakkinen | B60P 1/6463 702/41 |
| 2012/0209502 A1* | 8/2012 | Nichols | B62D 53/021 701/124 |
| 2012/0239257 A1* | 9/2012 | Ichinose | B60P 1/045 701/49 |
| 2014/0222303 A1* | 8/2014 | Chary | B60P 1/283 701/50 |
| 2014/0336883 A1 | 11/2014 | Thompson et al. | |
| 2016/0047689 A1* | 2/2016 | Stanley | G01G 19/12 702/174 |

FOREIGN PATENT DOCUMENTS

| | | |
|---|---|---|
| DE | 4227886 A1 | 2/1994 |
| WO | 2015037319 A1 | 3/2015 |

* cited by examiner

*Primary Examiner* — Jess Whittington
(74) *Attorney, Agent, or Firm* — James S. Bennin; Miller, Matthias & Hull

(57) ABSTRACT

A rollover prevention system for a machine is disclosed. The rollover prevention system may include an inertial measurement unit (IMU) configured to detect a discharge event of a payload material from the machine and measure a body angle of the machine. The rollover prevention system may further include a controller in communication with the IMU. The controller may be configured to determine an angle of repose of the machine based on the detected discharge event and the measured body angle.

20 Claims, 6 Drawing Sheets

ANGLE OF REPOSE DETECTOR FOR HAULING MACHINES

FIELD OF THE DISCLOSURE

The present disclosure relates generally to hauling machines and, more particularly, to rollover prevention systems and methods for hauling machines.

BACKGROUND OF THE DISCLOSURE

Hauling machines, such as dump trucks, may be used in various industries to transport a payload from one location to another. Generally, a hauling machine includes a frame that supports a dump body, or bed, which holds the payload. The bed may be pivoted between a load position and an unload position. More specifically, the bed may be raised or tilted upward in order to unload the payload onto the dump site.

During unloading of the payload, the center of gravity of the hauling machine may change as the bed is being raised. If the hauling machine is parked on a slope, there is a chance the machine may rollover while unloading the payload due to the shift in the center of gravity and incline of the slope. Accordingly, there exists a need for a rollover prevention system.

A method for preventing overturning is disclosed in U.S. Pat. No. 7,810,887, entitled, "Method and an Arrangement for Preventing Overturning a Dump Vehicle." The method of the '887 patent includes determining if there is a risk for a pair of wheels of the wheel axle of the forward vehicle section to lose ground contact or if the pair of wheels have already lost ground contact. When it is determined that the wheels of the forward axle have lost or are about to lose ground contact, the '887 method establishes a warning signal for preventing an uncontrolled rotation of the forward vehicle section relative to the rear vehicle section via the articulation joint.

While arguably effective, there is still a need for rollover prevention system and method that takes into account the angle of repose of the payload when unloading onto the dump site.

SUMMARY OF THE DISCLOSURE

In accordance with one embodiment, a rollover prevention system for a machine is disclosed. The rollover prevention system may include an inertial measurement unit (IMU) configured to detect a discharge event of a payload material from the machine and measure a body angle of the machine. The rollover prevention system may further include a controller in communication with the IMU. The controller may be configured to determine an angle of repose of the machine based on the detected discharge event and the measured body angle.

In accordance with another embodiment, a method of preventing rollover of a machine is disclosed. The method may include detecting a discharge event of a payload material from a body of the machine, and measuring a body angle of the machine when the discharge event is detected. The detecting and measuring may be performed by an inertial measurement unit (IMU). The method may further include determining an angle of repose of the machine based on the detected discharge event and the measured body angle, and preventing hoisting of the body of the machine based at least in part on the determined angle of repose. The determining and preventing may be performed by a controller.

In accordance with yet another embodiment, a hauling machine is disclosed. The hauling machine may include a body configured to hold a payload material, an operator cab housing an operator interface, the operator interface configured to receive input from and output data to an operator of the machine, a frame configured to support the body and the operator cab, a plurality of ground engaging members configured to support the frame, and an inertial measurement unit (IMU). The IMU may be configured to detect a loading event of a payload material into the body, detect a discharge event of a payload material from the body, measure a body angle of the machine, and measure a slope upon which the machine is positioned.

The machine may further include a controller in communication with the operator interface and the IMU. The controller may be configured to send signals to the operator interface to prompt the operator to select a type of payload material, receive data from the operator interface indicative of the type of payload material, determine an angle of repose for the type of payload material based on data received from the IMU indicative of a measured body angle when a discharge event is detected, and estimate a mass of a payload material in the body based at least in part on data received from the IMU indicative of a detected loading event.

The controller may be further configured to calculate a center of gravity of the machine based at least in part on the estimated mass of the payload material and data received from the IMU indicative of the measured slope. The controller may be further configured to generate a rollover angle based on the calculated center of gravity of the machine, compare the rollover angle to the determined angle of repose for the type of payload material, and if the rollover angle is less than or equal to the determined angle of repose for the type of payload material, disable commands to raise the body and send signals to the operator interface to notify the operator.

While the present disclosure is susceptible to various modifications and alternative constructions, certain illustrative embodiments thereof will be shown and described below in detail. The disclosure is not limited to the specific embodiments disclosed, but instead includes all modifications, alternative constructions, and equivalents thereof.

DETAILED DESCRIPTION

Figure 1:
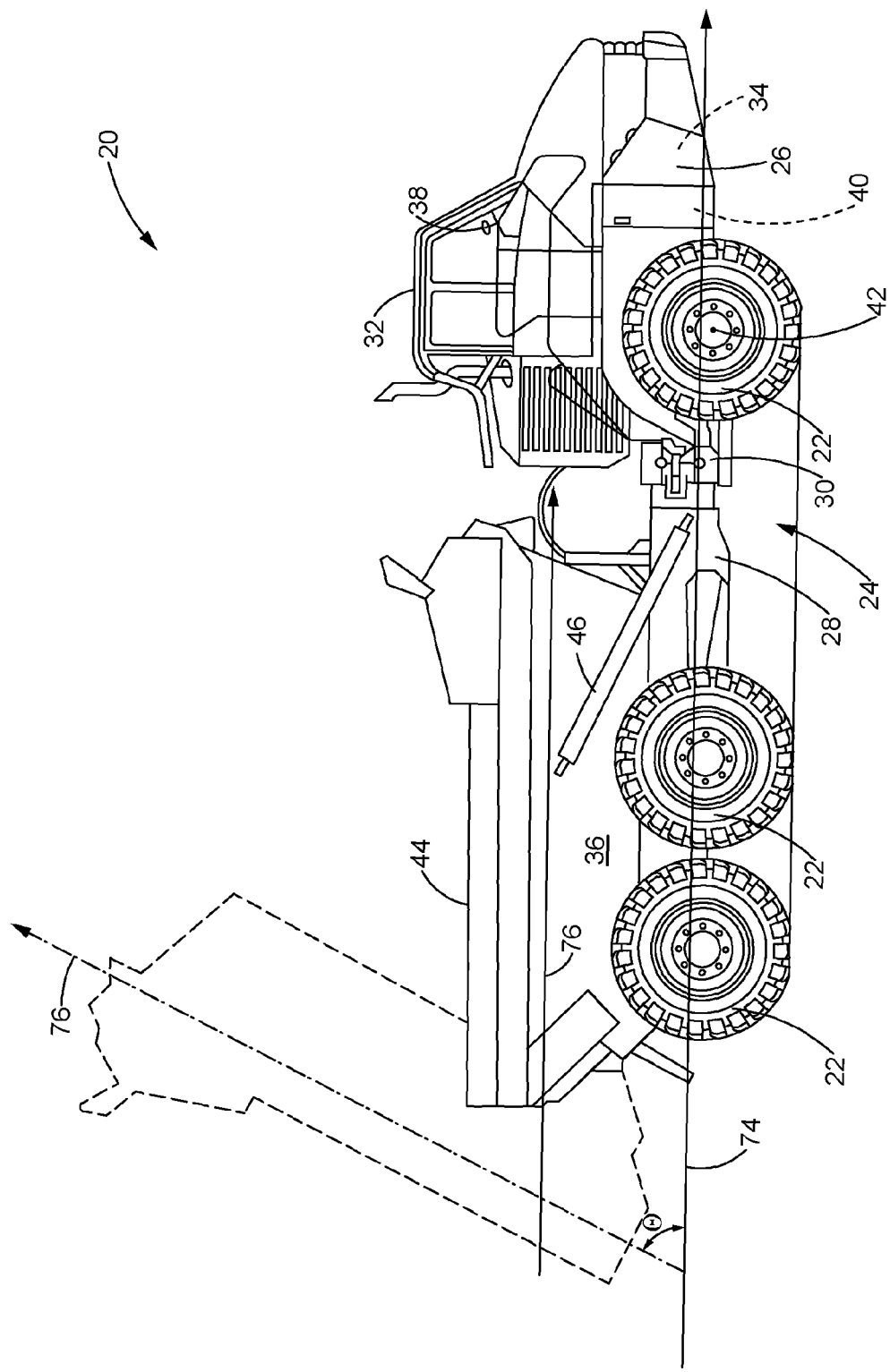
FIG. 1 is a side view of a machine, in accordance with one embodiment of the present disclosure.

Referring now to the drawings, and with specific reference to FIG. 1, a machine 20 is shown, in accordance with certain embodiments of the present disclosure. It is to be understood that although the machine 20 is illustrated as a truck, the machine may be of any other type. As used herein, the term "machine" refers to a mobile machine that performs a driven operation involving physical movement associated with a particular industry, such as, transportation, earthmoving, construction, landscaping, forestry, agriculture, mining, etc.

Non-limiting examples of machines include commercial and industrial machines, such as hauling machines, dump trucks, mining vehicles, on-highway vehicles, trains, motor graders, loaders, excavators, earth-moving vehicles, dozers, tractors, backhoes, agricultural equipment, material handling equipment, and other types of machines that operate in a work environment. It is to be understood that the machine 20 is shown primarily for illustrative purposes to assist in disclosing features of various embodiments, and that FIG. 1 does not depict all of the components of a machine.

The machine 20 may include a set of ground engaging members 22 that support a frame 24, such as a front frame 26 and a rear frame 28. Although the set of ground engaging members 22 are shown as wheels, the set of ground engaging members 22 may be any other type of traction device. The front frame 26 and the rear frame 28 may be coupled at an articulation joint 30. The front frame 26 may be configured to support an operator cab 32 and a drive system 34, while the rear frame 28 may be configured to support a bed, or body 36.

The operator cab 32 may house an operator interface 38 configured to receive input from and output data to an operator of the machine 20. Configured to drive the ground engaging members 22, the drive system 34 may include an engine or other power source that transmits power to a transmission 40. The transmission 40 may operatively transmit power to the ground engaging members 22, such as via axle 42.

Configured to hold a payload material 44, the body 36 may be selectively pivoted between a load position, as illustrated in solid line in FIG. 1, and an unload position, as shown in phantom in FIG. 1. One or more hoist cylinders 46 may raise or lower the body 36 in response to commands from the operator interface 38. For example, the hoist cylinders 46 may comprise hydraulic cylinders controlled via electrohydraulic valves, such as solenoid valves. However, other configurations may be used. Furthermore, although an articulated machine 20 is shown and described, aspects of this disclosure may apply to other types of hauling machines, such as non-articulated machines.

Figure 2:
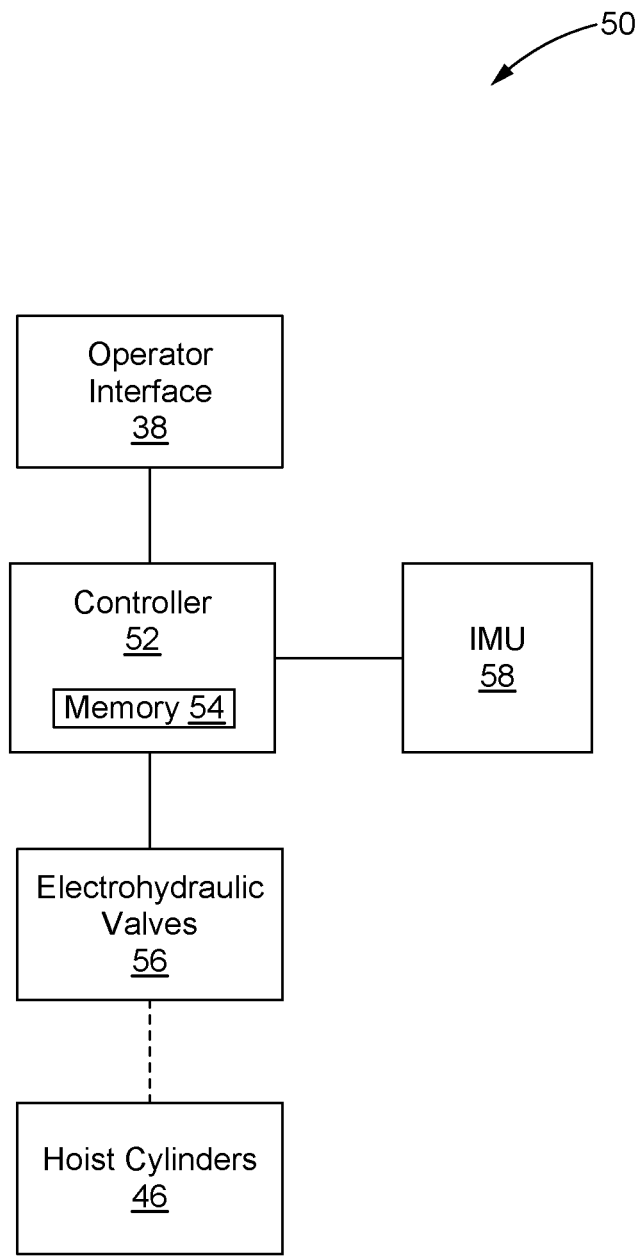
FIG. 2 is a schematic representation of a rollover prevention system for the machine of FIG. 1, in accordance with another embodiment.

Referring now to FIG. 2, with continued reference to FIG. 1, the machine 20 may further include a rollover prevention system 50. The rollover prevention system 50 may comprise a controller 52 in communication with the operator interface 38, one or more electrohydraulic valves 56, and an inertial measurement unit (IMU) 58. The controller 52 may be implemented using one or more of a processor, a microprocessor, a microcontroller, a digital signal processor (DSP), a field-programmable gate array (FGPA), an electronic control module (ECM), an electronic control unit (ECU), and a processor-based device that may include or be associated with a non-transitory computer readable storage medium having stored thereon computer-executable instructions, or any other suitable means for electronically controlling functionality of the machine 20.

For example, the controller 52 may be configured to operate according to predetermined algorithms or sets of instructions for operating the rollover prevention system 50. Such algorithms or sets of instructions may be programmed or incorporated into a memory 54 associated with or at least accessible to the controller 52. The memory 54 may comprise a non-volatile memory provided within and/or external to the controller 52. It is understood that the controller 52 and the rollover prevention system 50 may include other hardware, software, firmware, and combinations thereof.

The electrohydraulic valves 56 may be configured to control supply of hydraulic fluid to the one or more hoist cylinders 46. For example, the operator interface 38 may receive input from the operator indicative of a desired position of the body 36, such as commands to raise or lower the body 36, and may send signals to the controller 52 indicative of the same. Based on signals from the operator interface 38, the controller 52 may send corresponding signals to the electrohydraulic valves 56 in order to control hydraulic flow to the hoist cylinder 46. For instance, the controller 52 may send signals to the electrohydraulic valves 56 to increase or decrease hydraulic flow to the hoist cylinders 46, for raising or lowering the body 36, respectively.

The IMU 58 may comprise an electronic device that measures and provides signals to the controller 52 indicative of the machine's position, velocity, motion, and orientation using a combination of accelerometers, gyroscopes and, in some cases, magnetometers. For instance, the IMU 58 may include three orthogonally oriented accelerometers for detecting changes in position and measuring acceleration, three orthogonally oriented gyroscopes for detecting changes in orientation and measuring rotational attributes, such as the machine's pitch, roll and yaw, and, in some cases, three orthogonally oriented magnetometers serving as a three-dimensional electronic compass and assisting calibration against orientation drift. However, other numbers of sensors and types of configurations for the IMU 58 may be used.

Figure 3:
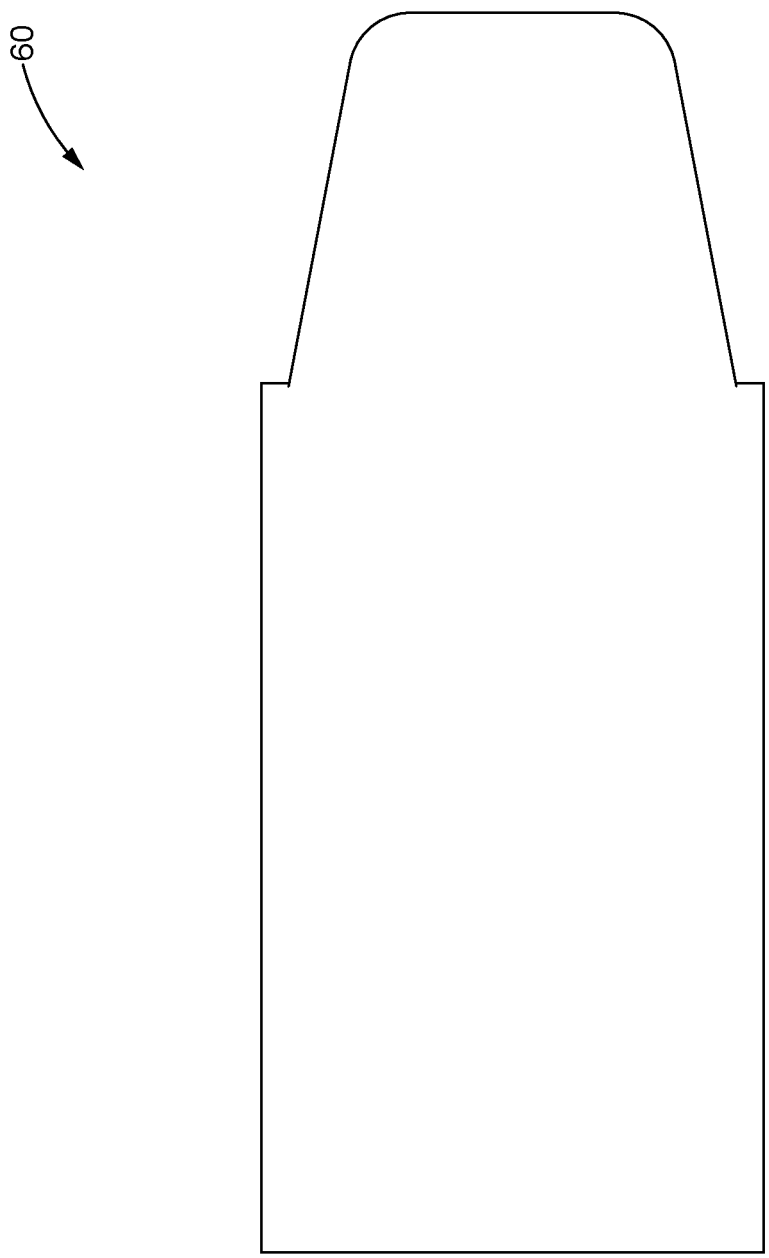
FIG. 3 is a plan view of a footprint of the machine of FIG. 1, in accordance with another embodiment.

The controller 52 may process information from the IMU 58 in order to prevent rollover of the machine 20. For example, the controller 52 may provide a warning to the operator via the operator interface 38 and prevent hoisting of the body 36 based on information from the IMU 58. More specifically, using real-time measurements from the IMU, the controller 52 may calculate a center of gravity of the machine 20 relative to a footprint of the machine 20. As used herein, the term "footprint" refers to an outline of a surface area on the ground that is directly covered by the machine 20. An example footprint 60 of the machine 20 is shown in FIG. 3.

Figure 4:
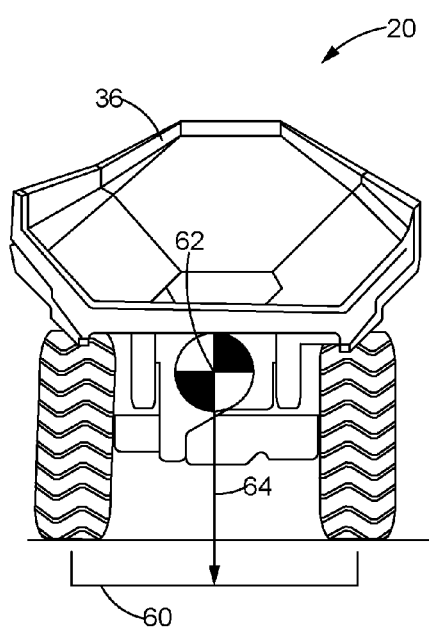
FIG. 4 is a diagrammatic view of the machine of FIG. 1 on level ground with its body lowered and without a payload material, in accordance with another embodiment.
Figure 5:
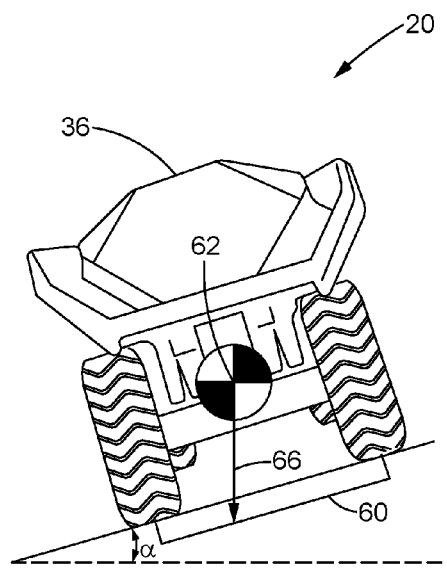
FIG. 5 is a diagrammatic view of the machine of FIG. 1 positioned on a slope with its body lowered and without a payload material, in accordance with another embodiment.

As shown in FIG. 4, if the machine 20 is on level ground and the body 36 is lowered, the center of gravity 62 of the machine 20 is relatively low and falls within the footprint 60 of the machine 20, as depicted by arrow 64. As such, the machine 20 is stable and unlikely to roll over. As shown in FIG. 5, if the machine 20 is positioned on an incline, or a slope $\alpha$, and the body 36 is lowered, the center of gravity 62 of the machine 20 is still relatively low and falls within the footprint 60 of the machine 20, as depicted by arrow 66. Again, in the example of FIG. 5, the machine 20 is stable and unlikely to roll over.

Figure 6:
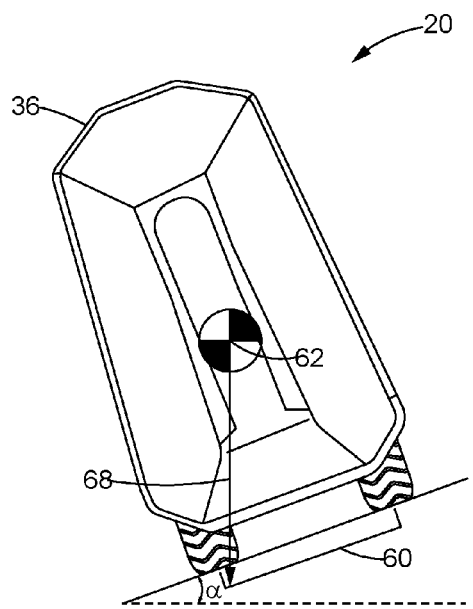
FIG. 6 is a diagrammatic view of the machine of FIG. 1 positioned on a slope with its body raised and without a payload material, in accordance with another embodiment.

Turning now to FIG. 6, if the machine 20 is positioned on the slope α without a payload material and the body 36 is raised, the center of gravity 62 of the machine 20 is higher than in the examples of FIGS. 4 and 5. The center of gravity 62 of the machine 20 moves as the body 36 is raised. In the example of FIG. 6, since the center of gravity 62 of the machine 20 still falls within the footprint 60 of the machine 20, as depicted by arrow 68, the machine 20 is stable and unlikely to roll over.

Figure 7:
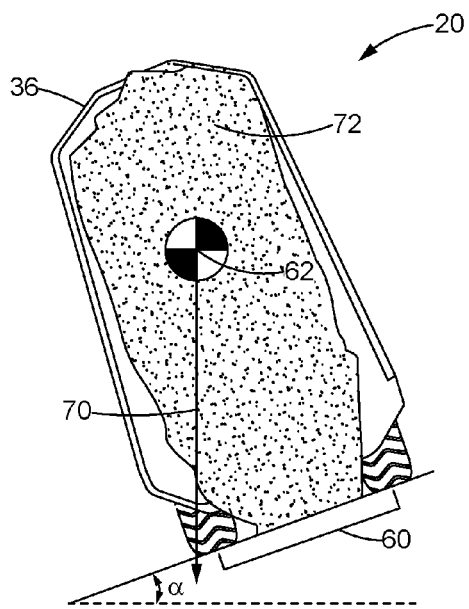
FIG. 7 is a diagrammatic view of the machine of FIG. 1 positioned on a slope with its body raised and containing a payload material, in accordance with another embodiment.

As shown in FIG. 7, the machine 20 is positioned on the slope α with the body 36 holding a payload material 72. With the body 36 raised, the center of gravity 62 of the machine 20 may be higher than in the examples of FIGS. 4-6, due to the payload material 72 being raised. If the center of gravity 62 falls outside the footprint 60 of the machine 20, as depicted by arrow 70, then the machine 20 is relatively unstable and may roll over on its side but for the teachings of the present disclosure. The examples in FIGS. 4-7 depict the machine 20 on a side slope, wherein the right side wheels are uphill and the left side wheels are downhill. However, the rollover prevention system 50 may apply to other scenarios as well, such as a position of the machine 20 on a slope wherein the front wheels are uphill and the rear wheels are downhill.

INDUSTRIAL APPLICABILITY

In general, the foregoing disclosure finds utility in various industrial applications, such as in transportation, mining, construction, industrial, earthmoving, agricultural, and forestry machines. In particular, the disclosed control system may be applied to hauling machines, dump trucks, mining vehicles, on-highway vehicles, trains, motor graders, loaders, excavators, earth-moving vehicles, dozers, tractors, backhoes, agricultural equipment, material handling equipment, and the like.

By applying the disclosed rollover prevention system to a machine, an angle of repose of the machine can be determined. In particular, determining the angle of repose allows for proactive and accurate prediction of rollover of the machine, such as in conditions where the machine is parked on a slope for discharging of the payload material. Furthermore, incorporating the payload material type into the system's analysis provides for optimal rollover prevention. In so doing, false rollover warnings can be avoided, and moreover, hoisting of the dump bed may be disabled in order to ensure the machine stays in a stable condition.

Figure 8:
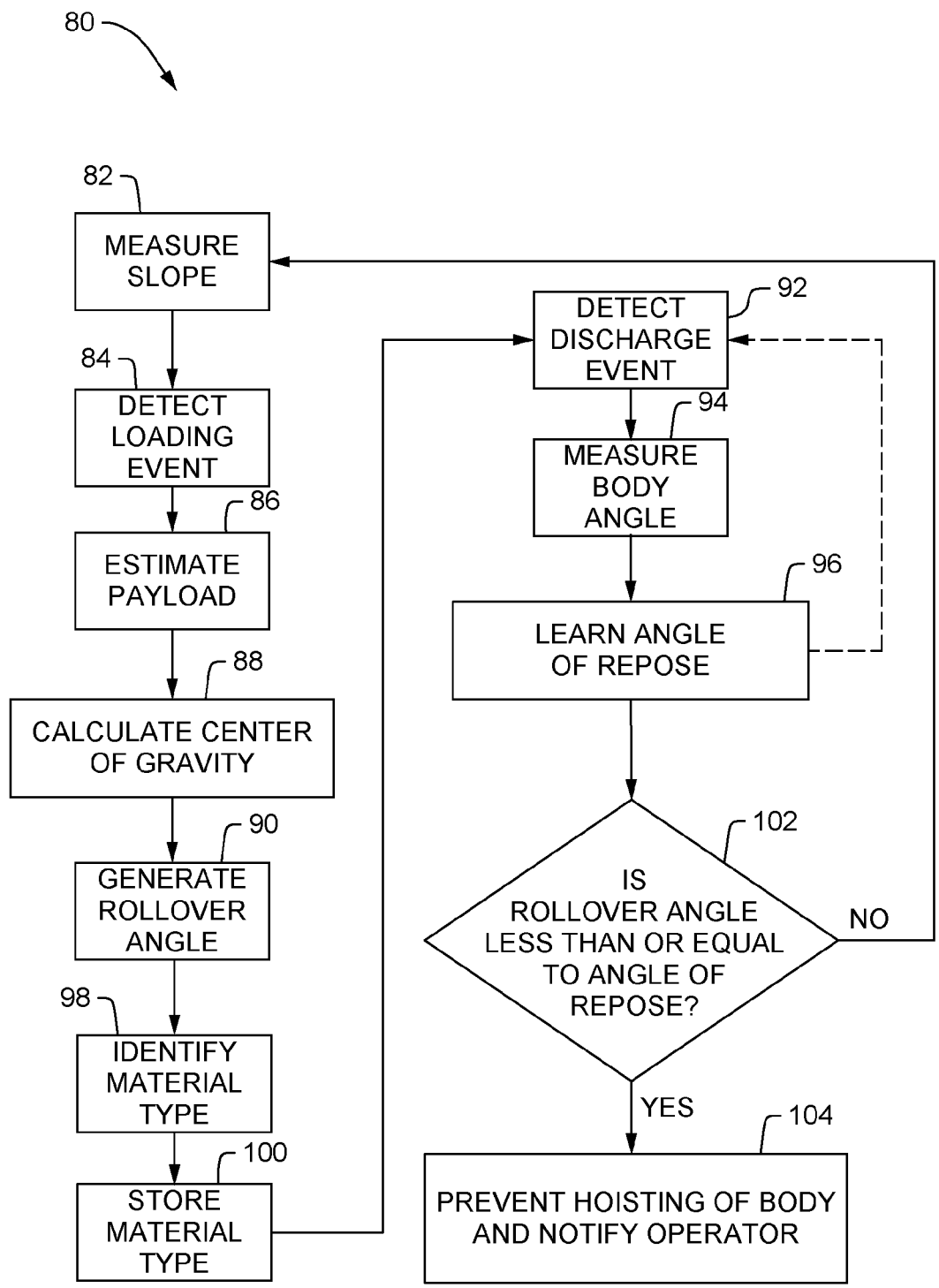
FIG. 8 is a flowchart illustrating an example process or algorithm for preventing rollover of a machine, in accordance with another embodiment.

Referring now to FIG. 8, with continued reference to FIGS. 1-7, an example flowchart 80 illustrating an example algorithm or process for preventing rollover of the machine 20 is shown, in accordance with another embodiment. The algorithm may be included in the rollover prevention system 50, such as via programming into the memory 54 of the controller 52. At block 82, the IMU 58 may be configured to measure the slope α upon which the machine is positioned 20, such as by measuring position and orientation changes of the machine 20. The IMU 58 may send signals indicative of the measured slope α to the controller 52.

At block 84, the IMU 58 may be configured to detect a loading event of a payload material into the body 36 by measuring vibration and orientation changes. For instance, if the machine 20 is stationary, the body angle is approximately zero degrees (0°), and the IMU 58 measures excess vibration, the IMU 58 may detect a loading event and send a corresponding signal to the controller 52. Once a loading event has been detected, the controller 52 may be configured to estimate an amount, or mass, of the payload material 72, at block 86.

In one example, the controller 52 may estimate the amount of the payload material 72 based on real-time measurements from the IMU 58 during machine operation, as well as predetermined information and formulae preprogrammed into memory 54. For instance, the controller 52 may use a measured acceleration of the machine 20, an estimated power at the wheels, a predetermined mass of the machine 20, and force equals mass times acceleration (F=m*a) calculations in order to estimate the amount of payload material 72 in the body 36. However, other processes and information may be used to estimate the amount of payload material 72.

At block 88, the controller 52 may be configured to calculate the center of gravity 62 of the machine 20 based on the estimated amount of the payload material 72 and the measured slope α upon which the machine 20 is positioned. For example, the controller 52 may use formulae for center of gravity preprogrammed into memory 54. Furthermore, at block 90, the controller 52 may be configured to generate a rollover angle based on the calculated center of gravity 62 of the machine 20. As used herein, the term "rollover angle" refers to a body angle of the machine 20 at which rollover will occur. As used herein, the term "body angle" refers to an angle of the body 36 relative to a horizontal axis 74 (FIG. 1) of the machine 20.

For instance, as shown in FIG. 1, the horizontal axis 74 may be parallel to or align with the frame 24 of the machine 20, such as the rear frame 28, and the body angle may comprise the angle between the horizontal axis 74 and a longitudinal axis 76 of the body 36. The body angle of the machine 20, as illustrated in FIG. 1, is zero degrees (0°) in the load position with the horizontal axis 74 of the machine 20 being parallel to the longitudinal axis 76 of the body 36. As shown in phantom in FIG. 1, the body angle θ of the machine is greater than zero degrees (>0°) in the unload position when the body 36 and its longitudinal axis 76 is raised, or tilted upward.

Referring back to FIG. 8, using real-time measurements for the slope α and the amount of payload material 72 to calculate the center of gravity 62, the controller 52 may then generate the rollover angle of the machine 20 in real-time, at block 90. For example, the controller 52 may use a predetermined footprint 60 of the machine 20, formulae and/or lookup tables preprogrammed into the memory 54 in order to generate the rollover angle based on the calculated center of gravity 62. In so doing, the controller 52 may proactively determine the rollover angle before the machine 20 raises the body 36.

Furthermore, the controller 52 may determine an angle of repose of the machine 20. As used herein, the term "angle of repose" refers to the body angle of the machine 20 at which the payload material 72 flows out of the body 36 of the machine 20 and is discharged. At block 92, the IMU 58 may be configured to detect a discharge event of the payload material 72 from the body 36 of the machine 20, such as by measuring vibration and orientation changes. For instance, if the machine 20 is stationary, the body 36 is rotating upward with the body angle being greater than zero degrees (>0°), and the IMU 58 measures excess vibration, the IMU 58 may detect a discharge event and send a corresponding signal to the controller 52.

Once a discharge event has been detected, a body angle of the machine 20 may be measured by the IMU 58 and sent to the controller 52, at block 94. For example, The IMU 58 may be positioned proximate the body 36 and may measure the body angle of the machine 20 by measuring position and orientation changes of the body 36. In addition to the IMU 58, other body position sensors may be used to measure the body angle of the machine 20. Examples of body position sensors may include rotary position sensors, linear displacement sensors, and cylinder position sensors. For instance, a rotary position sensor may be disposed on a hinge between the body 36 and frame rails of the machine 20, a linear displacement sensor may measure a distance between a point on the frame rails and a point on the body 36, or a cylinder position sensor may be built into the hoist cylinders 46. However, other configurations may be used.

At block 96, the controller 52 may determine the angle of repose based on the detected discharge event and the measured body angle. More specifically, the controller 52 may store in memory 54 the measured body angle of the machine 20 when the discharge event is detected. Moreover, every time a discharge event is detected, the controller 52 captures the body angle at which the discharge event was triggered. In so doing, the controller 52 can store the angle of repose at each discharge event and acquire corresponding data to build a table for the angle of repose in memory 54. The determined angle of repose may then be an average of all the stored angles of repose over time.

Furthermore, the controller 52 may determine the angle of repose for each type of payload material 72. For example, the type of payload material may be dirt, sand, gravel, asphalt, and any other type of material. Depending on the payload material type, the angle of repose may vary. For instance, the angle of repose for asphalt may be significantly greater than the angle of repose for gravel due to the cohesiveness and consistency of each.

In one example, the controller 52 may have a learning algorithm preprogrammed into memory 54. With the learning algorithm, the controller 52 may determine the angle of repose for different types of payload materials based on a frequency and timing of anomalous observations for the determined angle of repose. For instance, if the controller 52 stores a numerical value for the angle of repose that is equal to or within an approximate range of a previously stored angle(s) of repose, the controller 52 may group the approximate numerical values together and determine the angle of repose for one type of payload material.

If the controller 52 stores a numerical value for the angle of repose that is a unique anomalous observation, then the controller 52 may reject that value and not use it for the angle of repose. If the anomalous observation repeats itself, the controller 52 may treat it as a new type of payload material. Furthermore, the controller 52 may group together approximate numerical values for the angle of repose if they occur within a predetermined time period.

In another example, shown in the flowchart 80 of FIG. 8, the operator of the machine 20 may identify the type of payload material, at block 98. For example, the controller 52 may send a signal to the operator interface 38 in order to prompt the operator to select the type of payload material, such as at a beginning of a work cycle. In another example, the operator may enter the payload material into the operator interface 38 without being prompted. The operator interface 38 may include one or more buttons, joysticks, switches, dials, levers, keyboards, touchscreens, displays, monitors, screens, speakers, microphones, voice recognition software, control panels, and other types of operator controls. One or more of the operator controls may prompt and receive the operator identified payload material type.

After receiving the payload material type as identified by the operator, the operator interface 38 may send a corresponding signal to the controller 52. At block 100, the controller 52 may store the operator identified payload material type in memory 54. Referring again to block 96, the controller 52 may also determine the angle of repose based on the payload material type. More specifically, the controller 52 may classify the captured angles of repose based on the payload material type identified by the operator.

For instance, the operator may identify a first payload material type, and the controller 52 may store subsequent angles of repose in a first table associated with the first payload material type. When the operator identifies a second payload material type, the controller 52 may store subsequent angles of repose in a second table associated with the second payload material type. The operator may identify a new or old payload material type, and the controller 52 will store the captured angles of repose in corresponding tables accordingly. In so doing, the controller 52 can determine different angles of repose for different types of payload material.

At block 102, the controller 52 may be configured to compare the generated rollover angle to the determined angle of repose. If the rollover angle is greater than the angle of repose, then the controller 52 may determine that the machine 20 is stable and will not rollover. The body 36 may be raised to discharge the payload material 72, which is approximately at the determined angle of repose. The flowchart 80 may proceed back to block 82 and continue monitoring real time conditions of the machine 20.

If the rollover angle is less than or equal to the angle of repose, then the flowchart 80 may proceed to block 104. At block 104, the controller 52 may prevent hoisting of the body 36 and notify the operator via the operator interface 38. For example, the controller 52 may disable commands to the electrohydraulic valves 56, thereby disabling actuation of the hoist cylinders 46. In so doing, the controller 52 prevents the body 36 from being raised, which keeps the machine 20 stable and prevents the machine 20 from rolling over. In addition, the controller 52 may send signals to the operator interface 38 to alert the operator to move the machine 20 to level ground before raising the body 36. The operator interface 38 may use various operator controls to convey an audio, visual, and/or other type of message to the operator.

Figure 9:
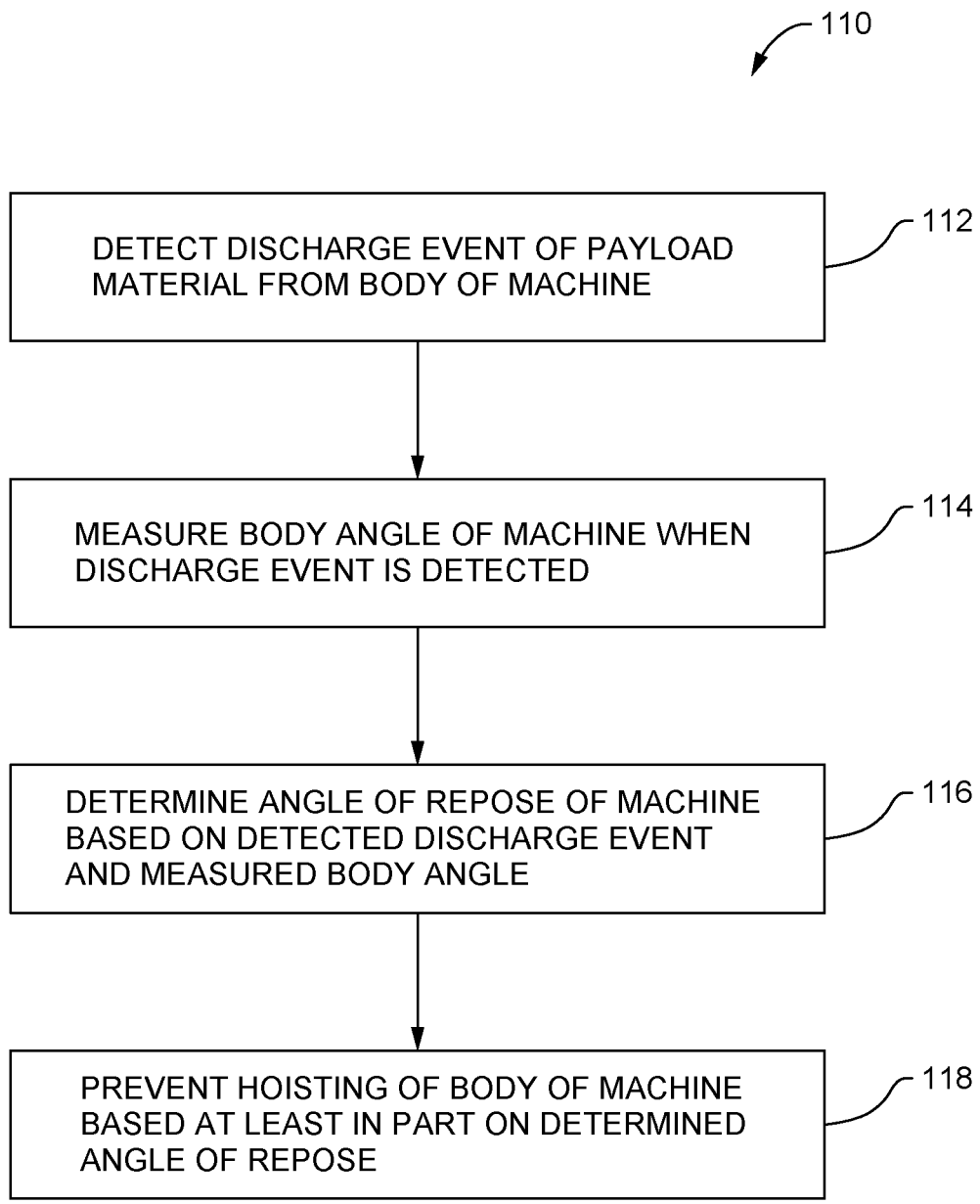
FIG. 9 is another flowchart illustrating an example process or algorithm for preventing rollover of a machine, in accordance with another embodiment.

Referring now to FIG. 9 with continued reference to FIGS. 1-8, another example flowchart 110 illustrating an example algorithm or process for preventing rollover of the machine 20 is shown, in accordance with another embodiment. At block 112, the IMU 58 may detect a discharge event of a payload material from the body 36 of the machine 20. At block 114, the IMU 58 may measure a body angle of the machine 20 when the discharge event is detected. The controller 52 may determine an angle of repose of the machine 20 based on the detected discharge event and the measured body angle, at block 116. At block 118, the controller 52 may prevent hoisting of the body 36 of the machine 20 based at least in part on the determined angle of repose.

It is to be understood that the flowcharts in FIGS. 8 and 9 are shown and described as an example only to assist in disclosing the features of the disclosed system, and that more or less steps than that shown may be included in the process corresponding to the various features described above for the disclosed system without departing from the scope of the disclosure.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. A rollover prevention system for a machine, the rollover prevention system comprising: an inertial measurement unit (IMU) configured to: detect a discharge event of a payload material from the machine, and measure a body angle of the machine; and a controller in communication with the IMU, the controller configured to: determine an angle of repose of the machine based on the detected discharge event and the measured body angle, the determined angle of repose being based on one or more angles of repose, the one or more angles of repose being stored in a memory associated with the controller, prevent rollover of the machine using the determined angle of repose of the machine and a rollover angle of the machine, send signals to an operator interface of the machine to provide information regarding the rollover angle and the determined angle of repose, and prevent hoisting of a body of the machine if the rollover angle is less than or equal to the determined angle of repose.

2. The rollover prevention system of claim 1, wherein the controller is further configured to determine an angle of repose for each different payload material.

3. The rollover prevention system of claim 2, further comprising an operator interface in communication with the controller, and wherein the controller is further configured to send signals to the operator interface to receive data indicative of a specific payload material.

4. The rollover prevention system of claim 2, wherein the controller is further configured to determine different payload material based on anomalous observations of the determined angle of repose.

5. The rollover prevention system of claim 1, wherein the IMU is further configured to measure a slope upon which the machine is positioned.

6. The rollover prevention system of claim 5, wherein the controller is further configured to estimate an amount of the payload material in the machine.

7. The rollover prevention system of claim 6, wherein the controller is further configured to generate the rollover angle of the machine based on the measured slope and the estimated amount of the payload material.

8. The rollover prevention system of claim 7, wherein the controller is further configured to calculate a center of gravity of the machine in order to generate the rollover angle.

9. The rollover prevention system of claim 7, wherein the controller is further configured to compare the rollover angle to the determined angle of repose.

10. The rollover prevention system of claim 9, wherein, after comparing the rollover angle to the determined angle of repose, the controller is further configured to send signals to the operator interface of the machine to notify the operator if the rollover angle is less than or equal to the determined angle of repose.

11. The rollover prevention system of claim 10, wherein the controller is further configured to prevent hoisting of a body of the machine if the rollover angle is less than or equal to the determined angle of repose.

12. A method of preventing rollover of a machine, the method comprising: detecting a discharge event of a payload material from a body of the machine; measuring a body angle of the machine when the discharge event is detected; determining by a controller, an angle of repose of the machine based on the detected discharge event and the measured body angle, the determined angle of repose being based on one or more angles of repose, the one or more angles of repose being stored in a memory associated with the controller; and preventing, by the controller, rollover of the machine by preventing hoisting of the body of the machine when a rollover angle of the machine is less than or equal to the determined angle of repose.

13. The method of claim 12, further comprising determining an angle of repose of the machine for each payload material, the determining being performed by the controller.

14. The method of claim 13, further comprising receiving data indicative of the payload material via an operator interface in communication with the controller.

15. The method of claim 12, further comprising measuring a slope upon which the machine is positioned, and estimating an amount of the payload material in the machine,
the measuring being performed by an inertial measurement unit (IMU) and the estimating being performed by the controller.

16. The method of claim 15, further comprising generating the rollover angle of the machine based on the measured slope and the estimated amount of the payload material, the generating being performed by the controller.

17. The method of claim 16, further comprising comparing the rollover angle to the determined angle of repose, the comparing being performed by the controller.

18. The method of claim 17, further comprising sending a signal to an operator interface to notify an operator of the machine if the rollover angle is less than or equal to the determined angle of repose, the sending being performed by the controller.

19. A hauling machine, comprising: a body configured to hold a payload material; an operator cab housing an operator interface, the operator interface configured to receive input from and output data to an operator of the machine; a frame configured to support the body and the operator cab; a plurality of ground engaging members configured to support the frame; an inertial measurement unit (IMU) configured to detect a loading event of a payload material into the body, detect a discharge event of a payload material from the body, measure a body angle of the machine, and measure a slope upon which the machine is positioned; and a controller in communication with the operator interface and the IMU, the controller configured to: send signals to the operator interface to prompt the operator to select a type of payload material; receive data from the operator interface indicative of the type of payload material; determine an angle of repose for the type of payload material based on data received from the IMU indicative of a measured body angle when a discharge event is detected, the determined angle of repose being based on one or more angles of repose, the one or more angles of repose being stored in a memory associated with the controller; estimate a mass of a payload material in the body based at least in part on data received from the IMU indicative of a detected loading event; calculate a center of gravity of the machine based at least in part on the estimated mass of the payload material and data received from the IMU indicative of the measured slope; generate a rollover angle based on the calculated center of gravity of the machine; compare the rollover angle to the determined angle of repose for the type of payload material; and prevent rollover of the hauling machine by disabling commands to raise the body and sending signals to the operator interface to notify the operator when the rollover angle is less than or equal to the determined angle of repose for the type of payload material.

20. The hauling machine of claim 19, wherein the frame includes a front frame configured to support the operator cab, a rear frame configured to support the body, and an articulation joint between the front frame and the rear frame.

* * * * *